United States Patent [19]
Lehfeldt

[11] 3,862,717
[45] Jan. 28, 1975

[54] METHOD AND APPARATUS FOR AUTOMATICALLY COMPUTING VERTICAL TRACK ANGLE

[75] Inventor: James J. Lehfeldt, Olathe, Kans.

[73] Assignee: King Radio Corporation, Olathe, Kans.

[22] Filed: Aug. 9, 1973

[21] Appl. No.: 387,209

[52] U.S. Cl........ 235/150.22, 235/150.27, 235/186, 235/191, 244/77 D, 340/27 AT
[51] Int. Cl............................................. G06g 7/32
[58] Field of Search..... 235/150.22, 150.23, 150.25, 235/150.26, 150.27, 183, 186, 189, 190, 191, 192, 193, 194, 184; 244/77 A, 77 B, 77 D

[56] References Cited
UNITED STATES PATENTS

| | | | |
|---|---|---|---|
| 3,398,267 | 8/1968 | Hattendorf | 235/150.23 |
| 3,588,477 | 6/1971 | Lami et al | 235/150.22 |
| 3,624,366 | 11/1971 | Angus | 235/150.22 |
| 3,644,722 | 2/1972 | Hobbs et al | 235/150.23 |
| 3,777,123 | 12/1973 | Games | 235/150.27 |

Primary Examiner—Felix D. Gruber
Attorney, Agent, or Firm—Lowe, Kokjer, Kircher, Wharton & Bowman

[57] ABSTRACT

A method and apparatus for computing vertical track angle is provided which uses the output from an area navigation computer and an altitude differential to make the desired computation. The apparatus includes suitable circuitry for producing a null at an output connection node point. Output of an integrator signal generating circuit means, after the null point is achieved, is the desired vertical track angle. Any aircraft deviation from the correct flight path after vertical track angle computation is completed is represented by an error signal at the output node which may be visually displayed.

6 Claims, 3 Drawing Figures

METHOD AND APPARATUS FOR AUTOMATICALLY COMPUTING VERTICAL TRACK ANGLE

BACKGROUND AND BRIEF DESCRIPTION OF THE INVENTION

This invention relates to a method and apparatus for computing vertical track angle and has particular utility in conjunction with an auto pilot circuit or a flight director.

The problem associated with vertical track angle involves the solution of a trigonometric equation. While the problem itself long has been solved by the pilot of an aircraft, the subject invention computes the problem solution and is configured to provide an error signal if the aircraft flight path deviates from that dictated by the automatic computation. This, of course, reduces pilot work load which is an important consideration in general aviation aircraft in which the invention has primary utility.

As indicated, the invention relates to a method and apparatus for computing a vertical track angle signal that can be used in an auto pilot control device to initiate the required aircraft maneuver for altitude change between a first presently held altitude and a second desired altitude. A circuit utilized therewith is constructed to indicate flight path deviation during altitude change. As a result, the method and apparatus enables an aircraft to make altitude changes in minimum time using relatively small angles for the change.

One of the primary objects of this invention is to provide a unique method and apparatus for enabling an aircraft to make altitude changes by computing vertical track angle. Accordingly a significant feature of the invention resides in its ability to reduce the pilot work load and to increase the safe operation thereof.

A further object of this invention is to provide a method and apparatus of the character described which generates an error signal to indicate deviation from the previously computed vertical track angle solution.

Another object of this invention is to provide a simple, low cost device for computing vertical track angle.

Another object of this invention is to provide a unique vertical track angle computation circuit which provides the necessary vertical track angle information to an associated auto pilot, thereby enabling the aircraft to change altitudes automatically.

Another object of this invention is to provide a device which utilizes an output from an area navigation computer, (e.g. distance to a way point), the way point being established by an altitude select system, and an altitude differential between the vertical way point and the present aircraft altitude to compute the vertical track angle to the vertical way point.

These and other objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views.

Figure 1:
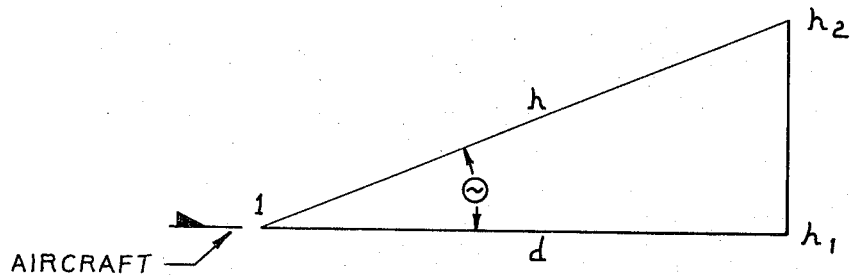
FIG. 1 is a plot detailing information which includes the vertical way point altitude, the distance to the vertical way point and present aircraft altitude that is needed for the solution of a vertical track angle $\theta$.

Turning now more particularly to the method and apparatus that permits the computation of vertical track angle, it may be seen, in FIG. 1, that vertical track angle (VTA) involves the solution of a trigonometric problem. The problem may be expressed mathematically as follows: $\tan \theta = h_2 - h_1/d$.

Restated, $(d)(\tan \theta) = h_2 - h_1$. For angles $\theta$ in radians, where $\theta$ is small, it is known that $\theta$ radians equals approximately $\tan \theta$. Consequently, $\tan \theta = \theta/57.3$, where $\theta$, or vertical track angle, is expressed in degrees.

The terms used in the above equation may be observed in FIG. 1, where $d$ equals the distance of an aircraft (generally indicated by the numeral 1) from the vertical way point; $\theta$ equals VTA, which for the purposes of this specification and in the art is the abbreviation for vertical track angle, sometimes also denominated as flight path angle; $h_1$ equals the barometric altitude as sensed by barometric altimeter; $h_2$ equals the selected altitude of the vertical way point; and $h$ corresponds to a vertical flight path for the aircraft 1. Accordingly, when $(d)[\theta/57.3] - (h_2 - h_1) = 0$, an equation having one unknown is presented, and the solution may be electrically obtained in a manner which will now be described in more detail.

Figure 2:
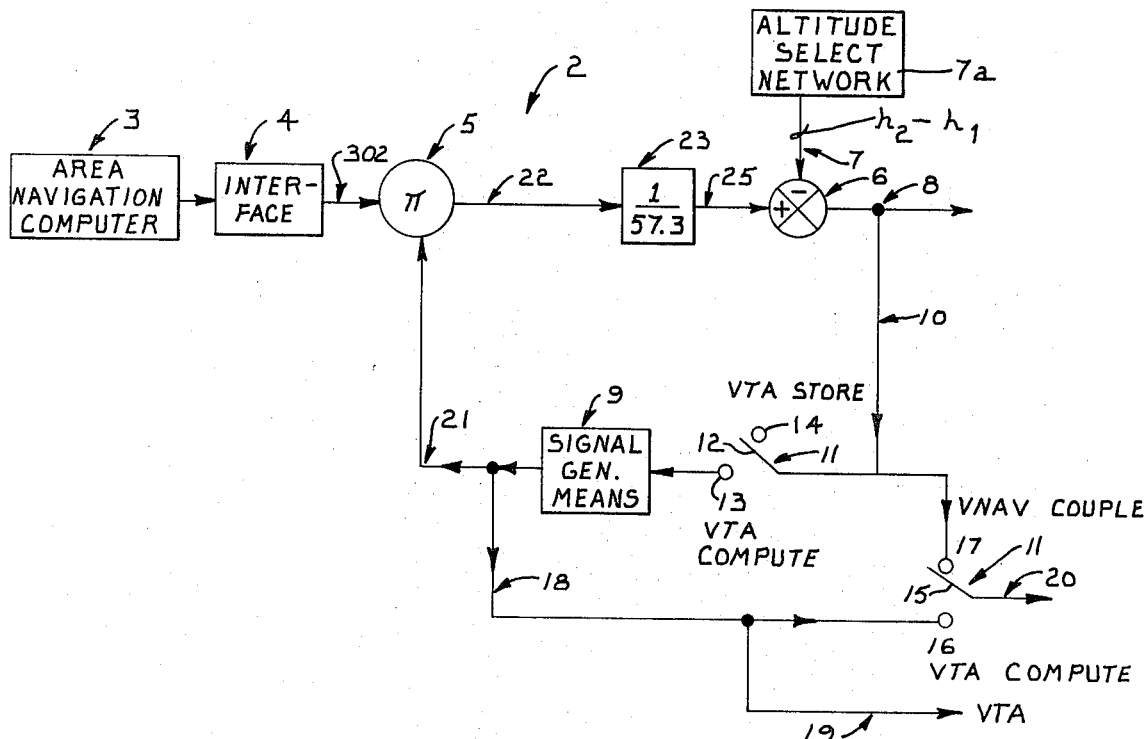
FIG. 2 is a block diagram showing a unique circuit for determining vertical track angle.

FIG. 2 shows a circuit (2) in block diagram form which is capable of solving the above equation. As shown, a separate area navigation computer 3 generates an output which includes signal information corresponding to the distance to the way point d. Output of the area navigation computer 3 is received by the circuit 2 at an input interface 4 (usually a buffer amplifier integrated circuit). Interface 4 (not shown in FIG. 3) is a conventional isolation amplifier. The output of interface 4 is a signal representation of the distance $d$ in FIG. 1. This signal forms a first input, along a conductor 302, to a multiplier 5.

The differential altitude signal corresponding to $h_2 - h_1$ is inputted to a summer 6 along a conductor 7. As shown in FIG. 2 the $h_2 - h_1$ signal is produced by an external "altitude select network" 7a. A similar network presently utilized is the Bendix Corporation's Flight Guidance System, identified by their numerical designation FGS 70. As indicated above, $h_2 - h_1$ is the difference between selected or desired altitude and the sensed barometric altitude of the aircraft 1 as measured by an associated altimeter. Output of the summer 6 is obtained at a node 8.

An integrator signal generating means 9 is connected to the node 8 via a conductor 10 and a manually actuated double pole double throw switch assembly 11. Switch assembly 11 includes a first pole 12 which has a VTA compute position terminal 13 and a VTA store position terminal 14. The second pole 15 of switch assembly 11 includes a VTA compute position terminal 16 and a VNAV couple position terminal 17. It may be observed in FIG. 2, that in the VTA compute positions of poles 12 and 15 of the switch assembly 11, the input of signal generating means 9 is electrically connected to the node 8 while the output of signal generating means 9 is connected, via a conductor 18 to a VTA output conductor 19, and to a display conductor 20 connected to an output side of switch assembly 11. However, when in the VTA store position of pole 12 and in the VNAV couple position of the pole 15 (of the switch assembly 11), the input side of signal generating means 9 is disconnected from the node 8 while the display conductor 20 is electrically connected to the node 8.

Output of signal generating means 9 also forms an electrical input along a conductor 21, to the multiplier 5. The output of multiplier 5 is connected, by a conductor 22, to a conversion means 23 with the output of same (conversion means 23) forming the second input for the summer circuit 6.

When VTA computation is desired, the switch assembly 11 is moved to the VTA compute position. As indicated above, the VTA compute position connects the input of signal generating means 9 to the node 8 and the output of the signal generating means 9 to multiplier 5, thereby completing a feedback loop.

Upon the placement of the switch assembly 11 in the VTA compute position 13 of pole 12 and position 16 of pole 15, the signal generating means 9 begins generating an increasing output. This output is then multiplied by the distance to the way point $d$ in the multiplier 5. The output of multiplier 5 is scaled by the conversion means 23 with its output (from conversion means 23) being summed with the altitude differential signal corresponding to $h_2 - h_1$ in the summer circuit 6.

The output of the signal generating means 9 will continue to increase until the voltage at node 8 goes to zero. When the voltage at node 8 is zero, the vertical track angle equation is solved so that $(d) [\theta/57.3] = (h_2 - h_1)$. At this instance in time, the output of the signal generating means 9 will be an electrical output that represents the true vertical track angle to the newly selected altitude $h_2$. As a practical matter, the output of signal generating means 9 may be obtained on conductor 20 so long as the switch assembly 11 is in VTA compute mode. However, the VTA signal on conductor 19 may be displayed regardless of the switch pole 15 position.

Figure 3:
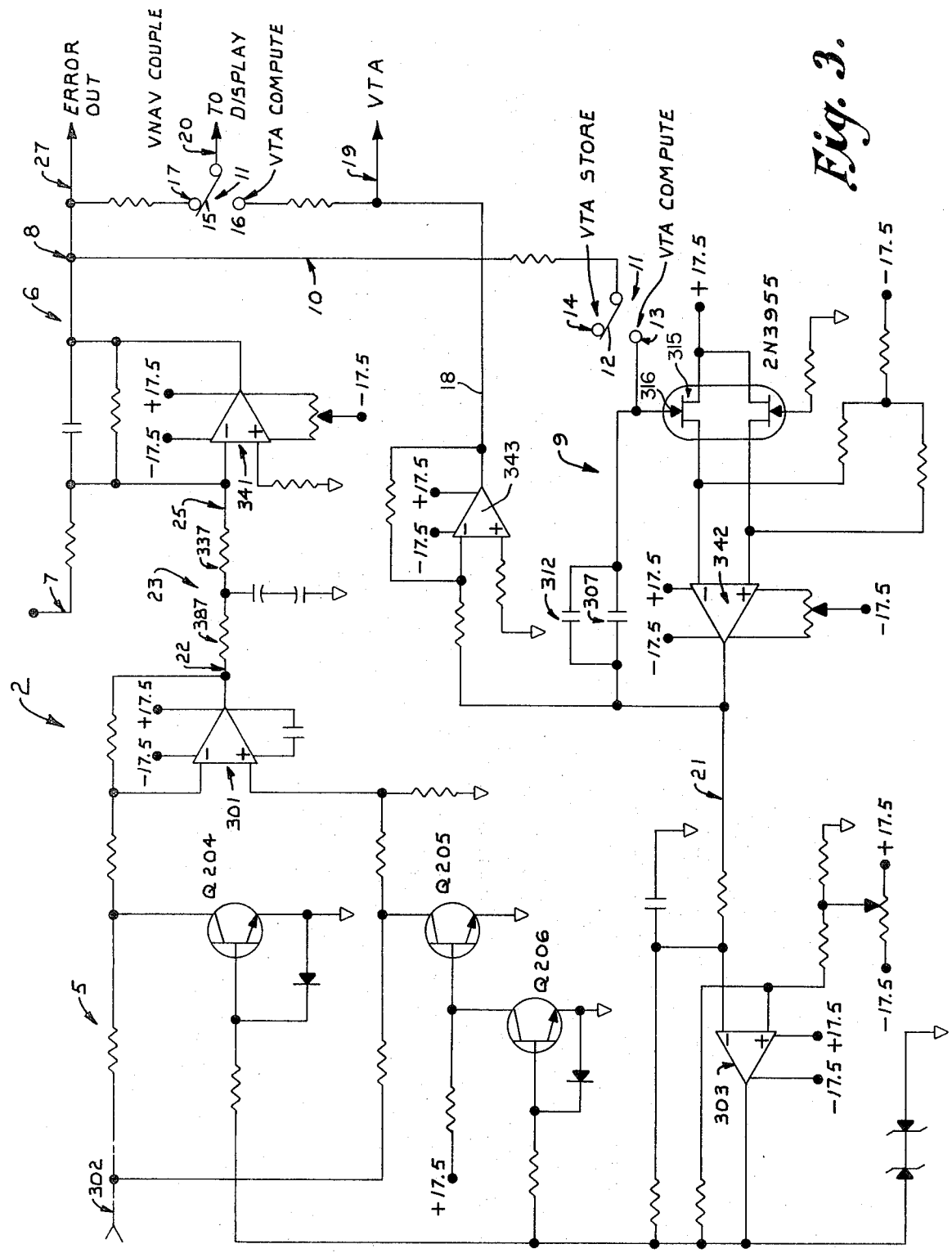
FIG. 3 is a more detailed schematic diagram of the circuit shown in FIG. 2.

Referring now to FIG. 3, multiplier 5 (an analog pulse width multiplier type) includes an output amplifier 301 having the data from the area navigation computer inputted at the conductor 302. Output of the signal generating means 9 is inputted to the multiplier 5 along the conductor 21 and an amplifier 303. Multiplier 5 includes transistors Q204, Q205 and Q206 which develop the signal input to amplifier 301.

Conversion means 23 includes resistors 387 and 337 which function to perform the necessary scaling conversion of the signal outputted from the multiplier 5 along the conductor 22.

Summer circuit 6 includes an amplifier 341 which receives the externally generated, $h_2 - h_1$ input along the conductor 7 and the scaled $(d)(\theta)$ signal along a conductor 25. Output of the amplifier 341 appears at the node 8, which those skilled in the art will recognize as a common connection point, although shown as several connection points in FIG. 3.

Signal generating means 9 include a 2N3955 (matched pair of junction type field effect transistors), an amplifier 342 and a pair of capacitors 312 and 307. The 2N3955, amplifier 342, along with capacitor 307 and 312 comprise an electronic integrator. In order to accomplish this, the 2N3955 provides high impedance to amplifier 342 to keep capacitors 307 and 312 from inadvertently discharging and therefore losing the stored VTA (voltage level). Output of the signal generating means 9 is, as indicated above, electrically connected, via conductor 21, to multiplier 5 and via conductor 18 and isolating amplifier 343 to line 19, and to the display conductor 20 when switch assembly 11 is in the VTA compute position.

In operation the integrator signal generator 9 charges capacitors 312 and 307 as long as a non zero input is delivered to gate 316 in FET 315. When the voltage at gate 316 goes to zero, as, for example, when a null has been reached, charging of capacitors 307 and 312 ceases. At this time the voltage across the capacitors 307 and 312 will correspond to VTA. With switch 11 in position 14, the voltage appearing at gate 316 will be zero, since the feedback loop has been interrupted, and an error signal will consequently appear at node 8 if the other parameters are varied. The error signal will be displayed since line 20 is interconnected to node 8 via pole 15 during this latter interval. Switch 11 must however, be in the VTA compute position before the VTA will be automatically recalculated in response to changes in the other parameters.

On attainment of a null at node 8, switch assembly 11 may be placed in the VTA store position 14 at station 12 and in the VNAV couple position 17 at station 15. The last mentioned position has the effect of connecting the display conductor 20 to the node 8.

Signal generating means 9 will retain the output in the VTA store position under the initial condition obtained when node 8 is a null. If the aircraft 1 flies the proper vertical track angle theta, along the flight path, the product of the area navigation computer 3 and the signal generating means 9 when summed with the $h_2 - h_1$ signal in the summer circuit 7 will continually register a null at node 8. Should deviation occur, however, the product of the $(d) [\theta/57.3]$ no longer will equal $(h_2 - h_1)$ and an error signal will appear at node 8. The error signal at node 8 is outputted, via a conductor 27, to an auto pilot not shown and to suitable display means via conductor 20.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A device for computing vertical track angle, said device having a first signal input representing horizontal distance to a vertical waypoint and a second signal input representing the difference between a first aircraft altitude and a second desired aircraft altitude, said device comprising:

means for generating a third signal, said generating means having an input and an output;

means for multiplying said third input signal with said first signal, said multiplying means having an output product signal;

means for obtaining a signal corresponding to the difference between the output product signal and said second signal; and means for applying said difference signal to said generating means whereby the output of the generating means corresponds to VTA (vertical track angle) when the output of said difference signal obtaining means is zero.

2. The device of claim 1 wherein the output of said difference signal obtaining means appears at a connection node, the input of said generating means being electrically connected to said node.

3. The device of claim 2 wherein said applying means comprises a switch means interposed between said connection node and the input of said generating means, said switch means having at least two poles, each of said poles having a plurality of positions, one of said switch poles adapted to connect and disconnect the input of said generating means to said connection node and the other of said switch poles adapted to connect an output of said switch to the output of said generating means when the input of said generating means is connected to said connection node and to connect said output of said switch to said connection node when the input of said generating means is disconnected from said connection node.

4. The device of claim 3 including a conversion means electrically connected between the output of said multiplying means and one of the inputs of said difference signal obtaining means.

5. The device as in claim 1 wherein said device computes a vertical track angle by solving the equation $(d)[0/57.3] = h_2 - h_1$, and wherein said difference signal applying means has an output side connection node with said signal generating means having its output connected to said connection node, said applying means comprising:

a switch means interposed between said connection node and the input of said generating means, said switch means having at least two poles having a plurality of positions, one of said switch poles being adapted to connect and disconnect the input of said generating means to said connection node, and the other of said switch poles being adapted to connect one of said plurality of positions of said last mentioned poles to the output side of said generating means in the connected position of said first pole, and to said connection node in the disconnected position of said first pole.

6. A method of computing vertical track angle, said method comprising the steps of:

receiving a first signal representing horizontal distance to a vertical way point at a multiplying means;

receiving a second signal representing the differences between a first desired aircraft altitude and a second known aircraft altitude at a signal difference obtaining means;

applying the input of an integrator signal generating means to the output of said difference signal obtaining means, the output of said generating means being electrically applied to said multiplier means;

scaling the output of said multiplying means; and inputting the scaled output of said multiplying means to said difference signal obtaining means, said output of said generating means corresponding to VTA (vertical track angle) when the output of said difference signal obtaining means is zero.

* * * * *